United States Patent [19]

Takeda

[11] Patent Number: 5,363,500
[45] Date of Patent: Nov. 8, 1994

[54] SYSTEM FOR IMPROVING ACCESS TIME TO VIDEO DISPLAY DATA USING SHADOW MEMORY SIZED DIFFERENTLY FROM A DISPLAY MEMORY

[75] Inventor: Koji Takeda, Suwa, Japan

[73] Assignee: Seiko Epson Corporation, Tokyo, Japan

[21] Appl. No.: 645,902

[22] Filed: Jan. 24, 1991

[30] Foreign Application Priority Data

Jan. 25, 1990 [JP] Japan ................................ 2-15303
Mar. 22, 1990 [JP] Japan ................................ 2-72868
Mar. 22, 1990 [JP] Japan ................................ 2-72869

[51] Int. Cl.$^5$ ................... G06F 12/00; G06F 13/00; G06F 15/62; G09G 1/02
[52] U.S. Cl. .................. 395/425; 395/164; 345/185; 345/201; 364/DIG. 1
[58] Field of Search ............... 395/425, 164, 166, 115, 395/400; 340/750, 799; 345/185, 201

[56] References Cited

U.S. PATENT DOCUMENTS

| 4,958,304 | 9/1990 | Moore | 345/201 |
| 5,170,468 | 12/1992 | Shah et al. | 395/166 |
| 5,227,863 | 7/1993 | Bilbrey et al. | 358/22 |

Primary Examiner—Glenn Gossage
Attorney, Agent, or Firm—W. Douglas Carothers, Jr.; Eric B. Janofsky

[57] ABSTRACT

A system for improving access time to video display data uses a shadow memory having fewer storage locations than a display memory. The shadow memory and the display memory share a set of addresses such that data written to the display memory, at an address shared by the shadow memory, is identically written to the shadow memory. Read requests directed to the display memory result in: (a) data returned from the shadow memory when access to a shared address is requested, and (b) data returned from the display memory when access to a non-shared address is requested.

1 Claim, 19 Drawing Sheets

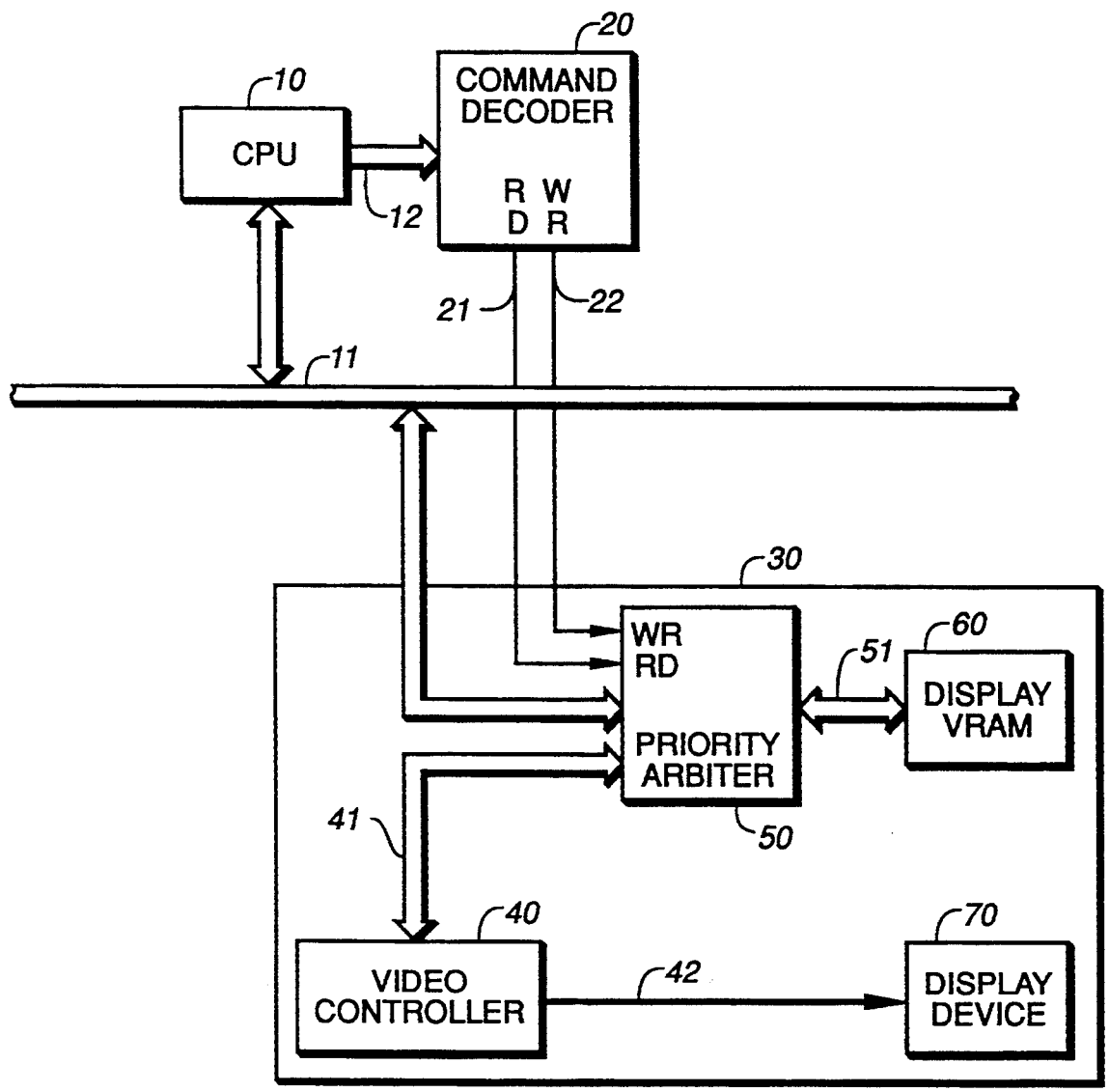
FIG._1
(PRIOR ART)

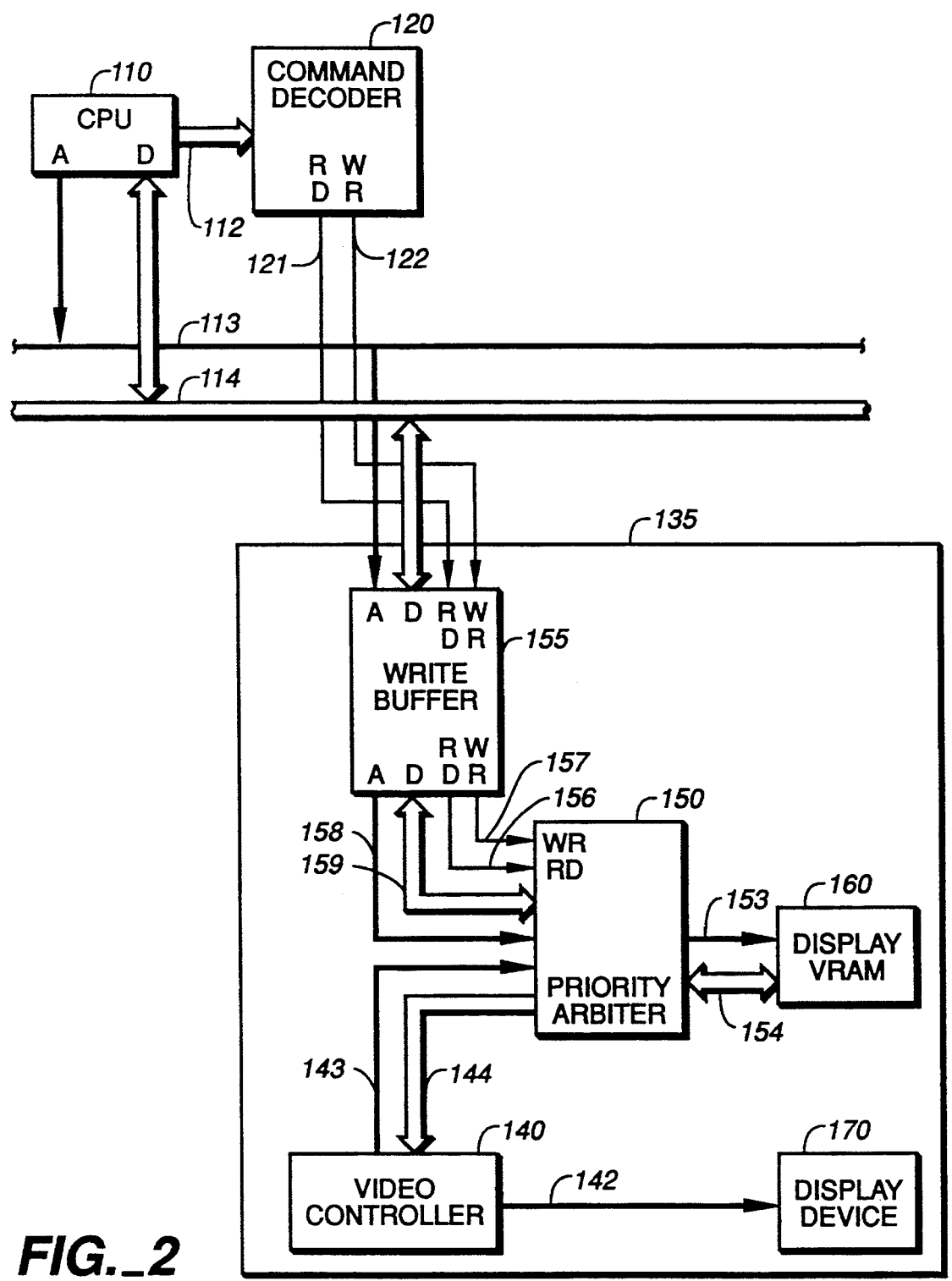
FIG._2
*(PRIOR ART)*

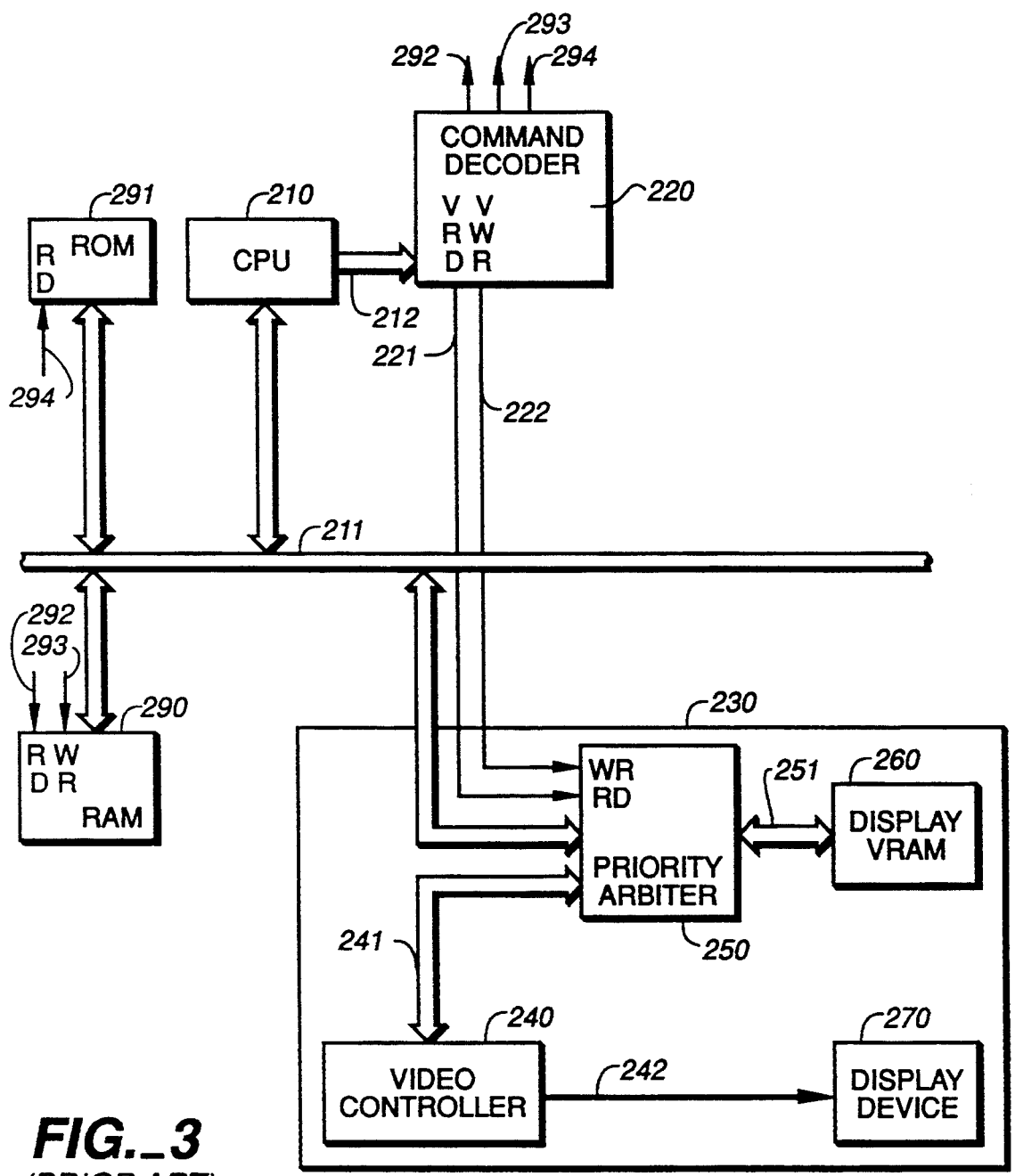
FIG._3
(PRIOR ART)

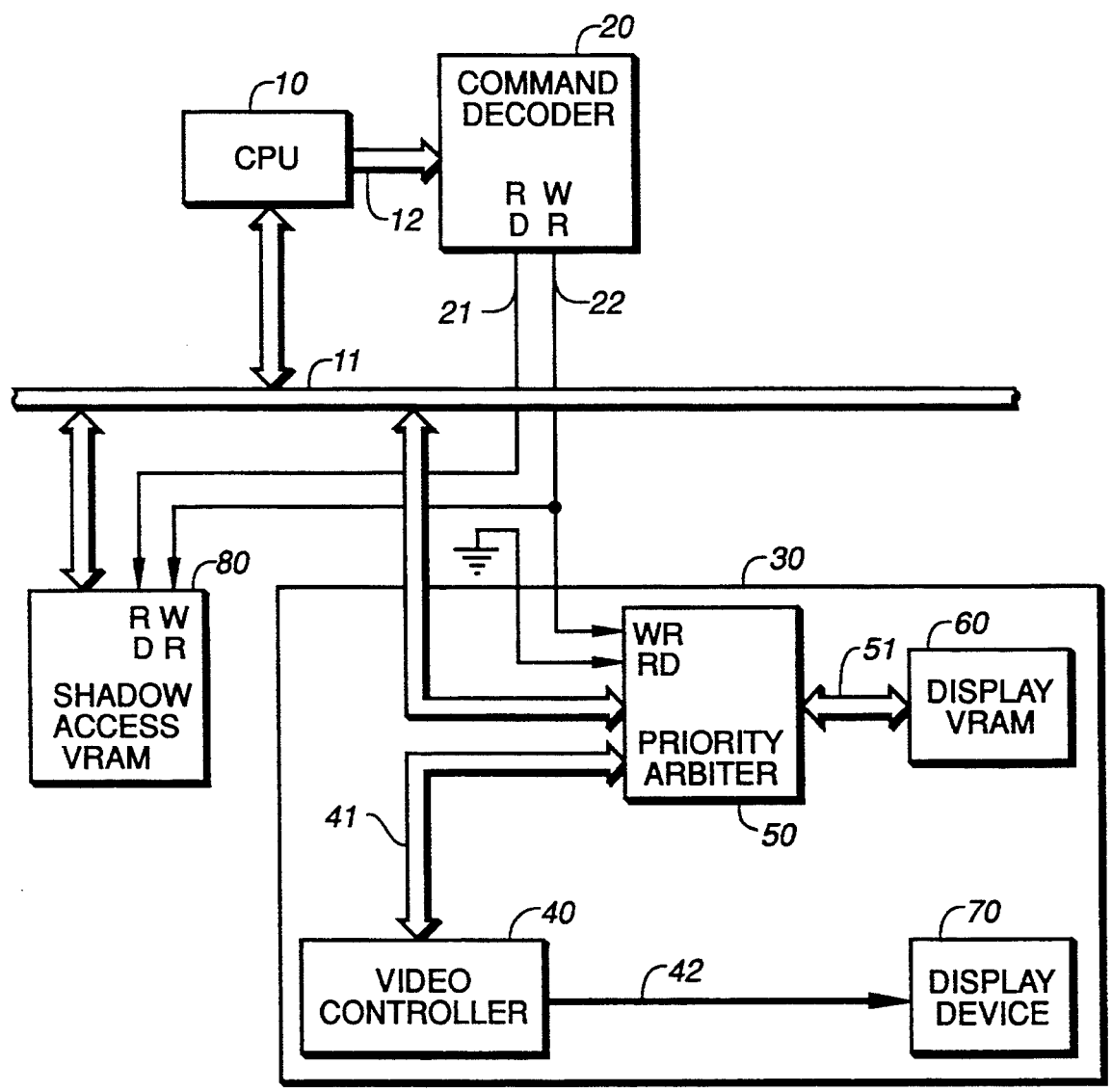
FIG._4

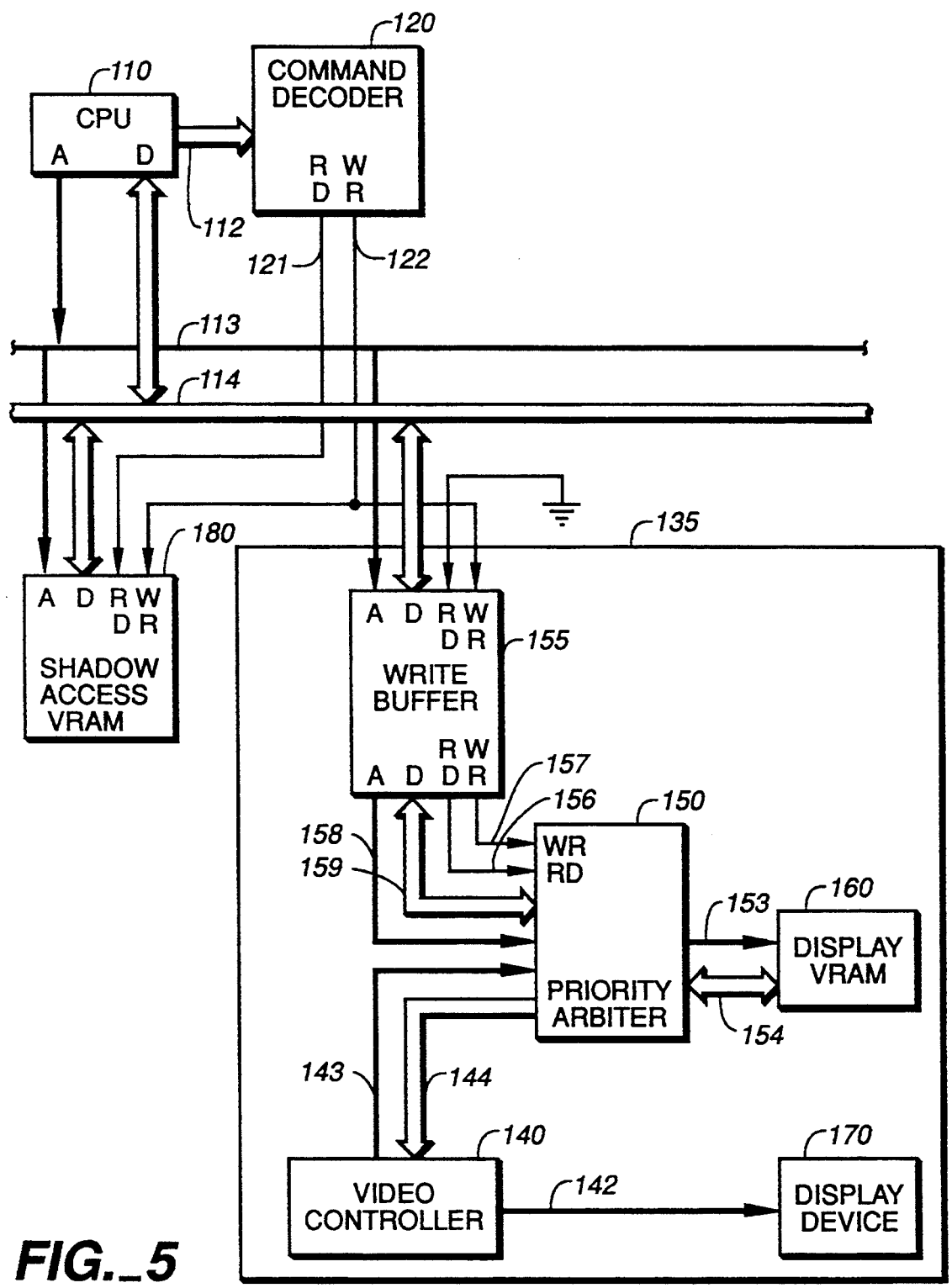
FIG._5

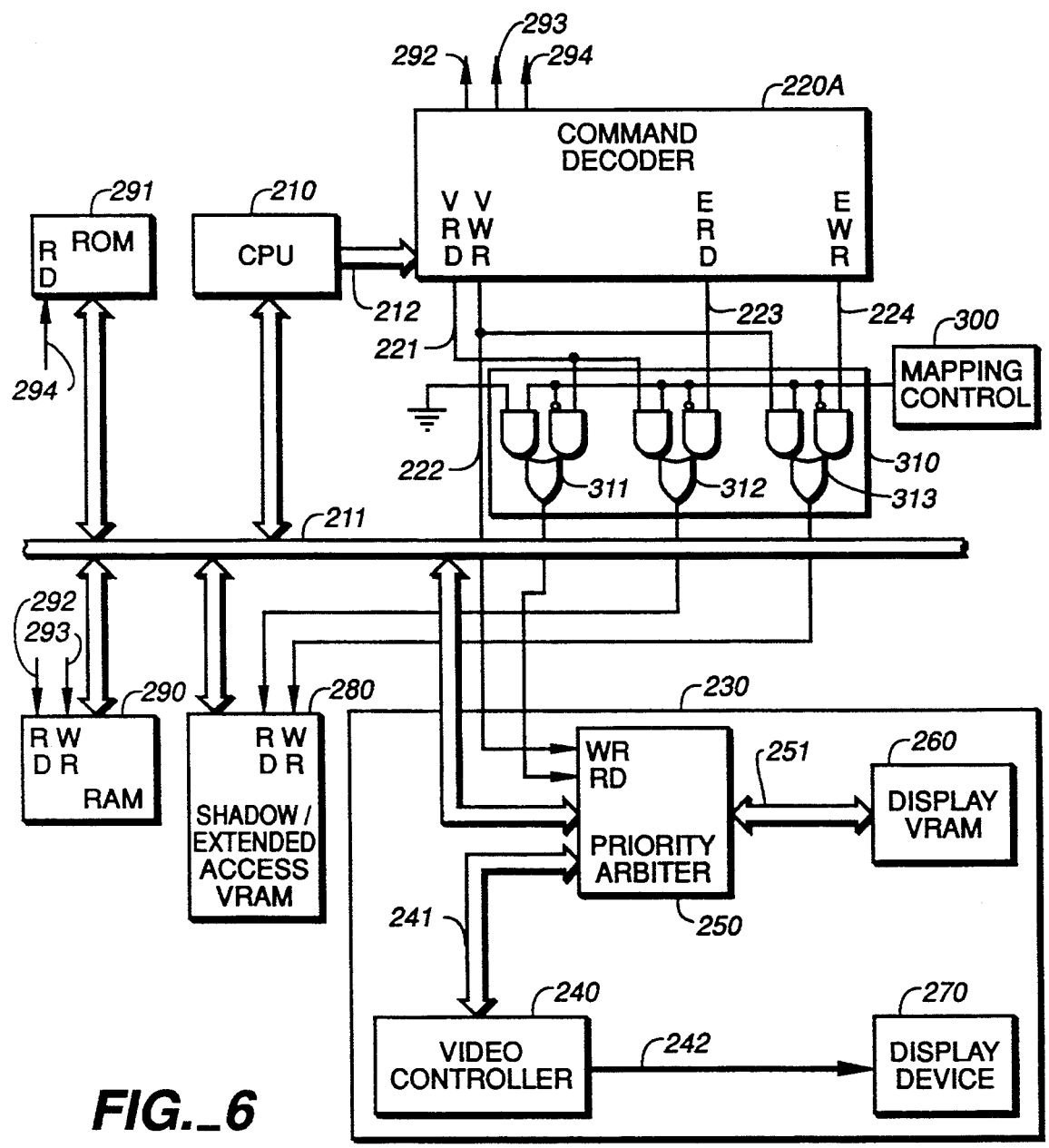
FIG._6

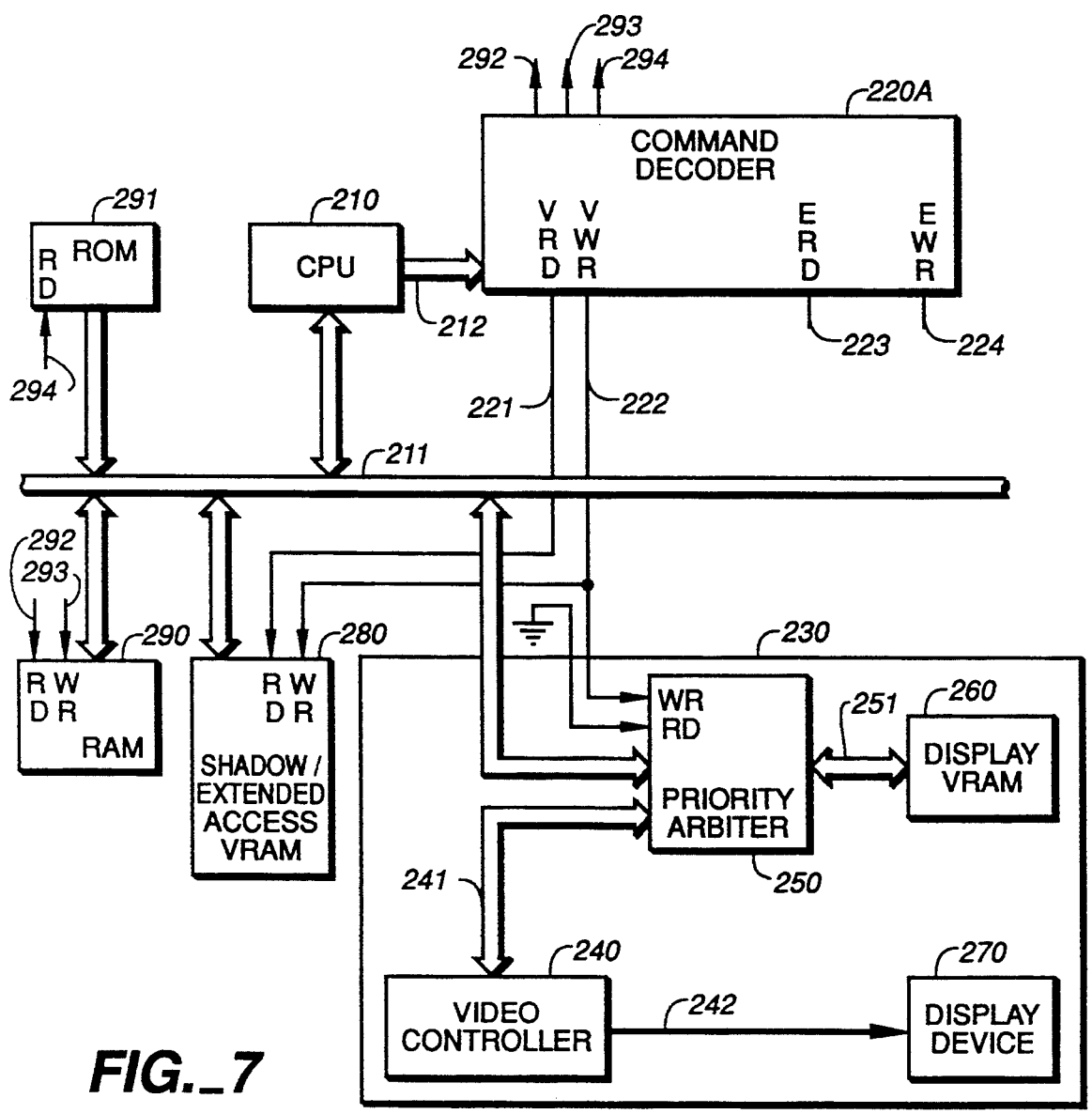
FIG._7

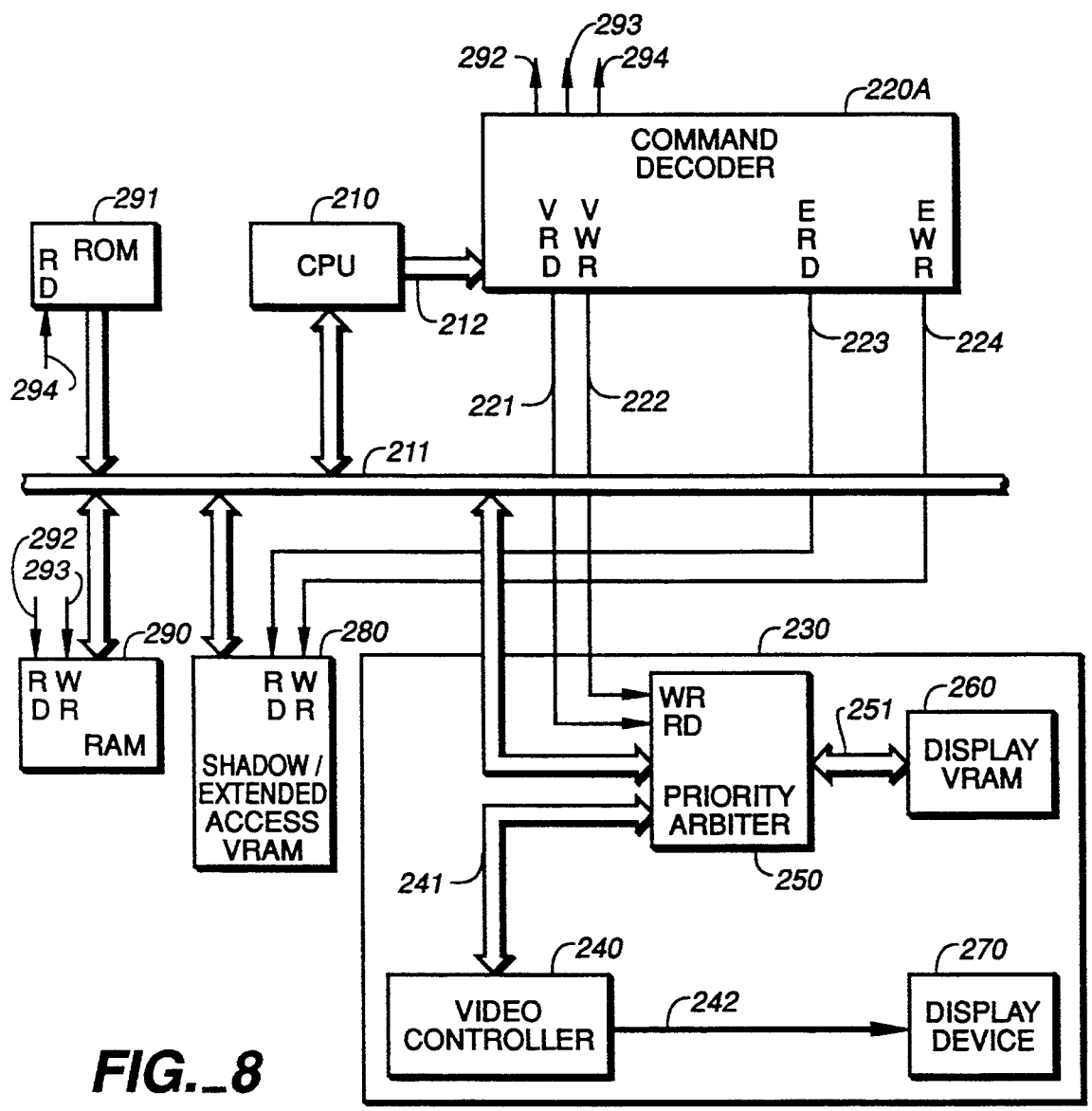
FIG._8

| NO | SIGNAL | ADDRESS | READ/WRITE |
|----|--------|---------|------------|
| 21 | VRAM READ SIGNAL | 0A0000H ~ 08FFFFH | READ |
| 22 | VERAM WRITE SIGNAL | 0A0000H ~ 08FFFFH | WRITE |
| 23 | EXTENDED MEMORY READ SIGNAL | 100000H ~ 11FFFFH | READ |
| 24 | EXTENDED MEMORY WRITE SIGNAL | 100000H ~ 11FFFFH | WRITE |
| 92 | RAM READ SIGNAL | 000000H ~ 09FFFFH | READ |
| 93 | RAM WRITE SIGNAL | 000000H ~ 09FFFFH | WRITE |
| 94 | ROM READ SIGNAL | 0E0000H ~ 0FFFFFH | READ |

FIG._9

| OPERATIONAL MODE / MEMORY | OPERATIONAL MODE 1 ||| OPERATIONAL MODE 2 |||
|---|---|---|---|---|---|---|
| | ADDRESS (CAPACITY) | FUNCTION | REMARKS | ADDRESS (CAPACITY) | FUNCTION | REMARKS |
| RAM 290 | 000000H ~ 09FFFFH (640 KB) | MAIN MEMORY | COULD SERVE AS ACCESS VRAM IF 1 MB | 000000H ~ 09FFFFH (640 KB) | MAIN MEMORY | |
| ROM 291 | 0E0000H ~ 0FFFFFH (128 KB) | BIOS - ROM | READ ONLY | 0E0000H ~ 0FFFFFH (128 KB) | BIOS - ROM | READ ONLY |
| DISPLAY VRAM 260 | 0A0000H ~ 0BFFFFH (128 KB) | VRAM | WRITE ONLY FROM CPU | 0A0000H ~ 0BFFFFH (128 KB) | VRAM | NORMAL READ ACCESS DELAYS |
| SHADOW / EXTENDED ACCESS VRAM 280 | 0A0000H ~ 0BFFFFH (128 KB) | VRAM | SHADOWS DISPLAY VRAM | 100000H ~ 11FFFFH (128 KB) | EXTENDED MEMORY | EXTENDS MAIN MEMORY |

*FIG._10*

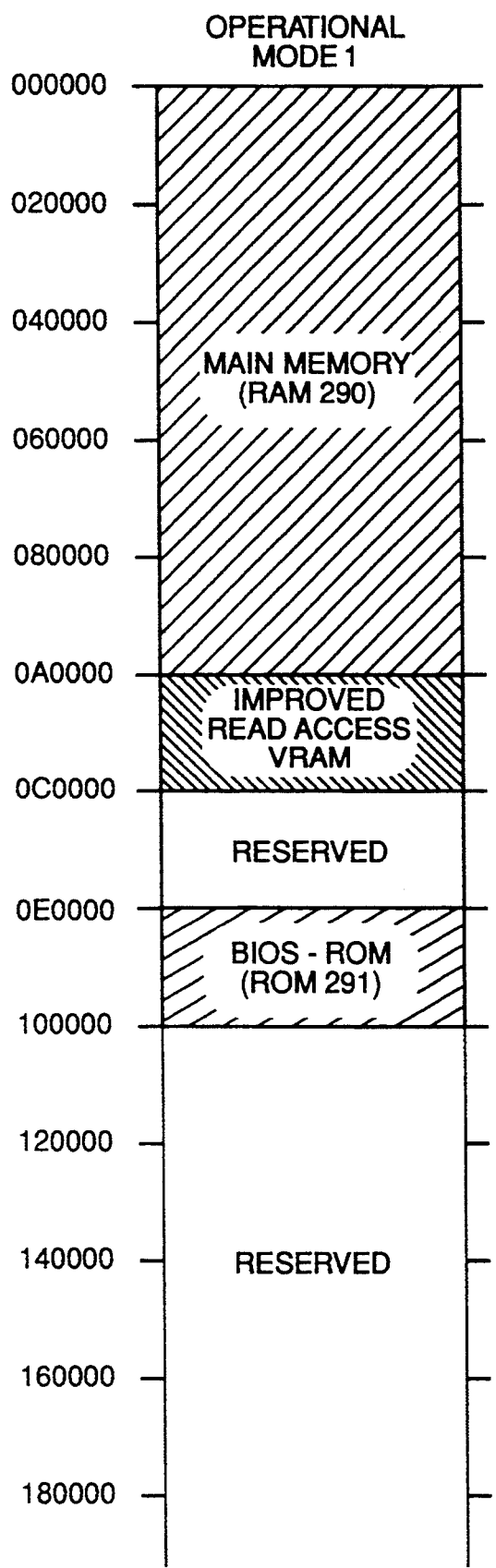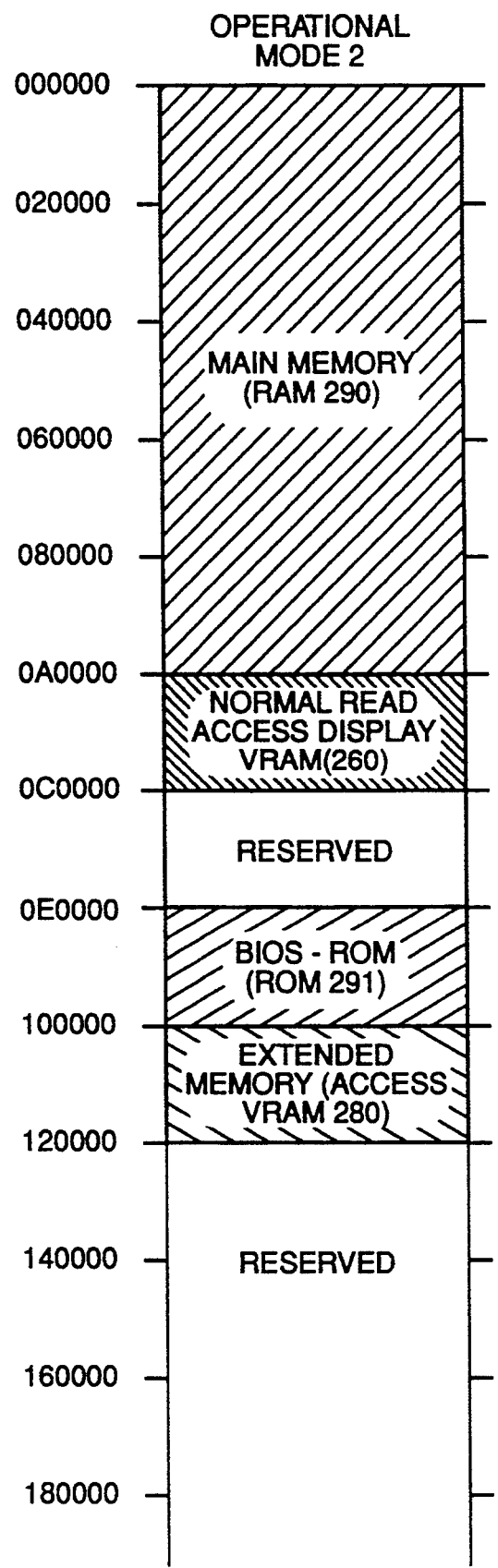
FIG._11A  FIG._11B

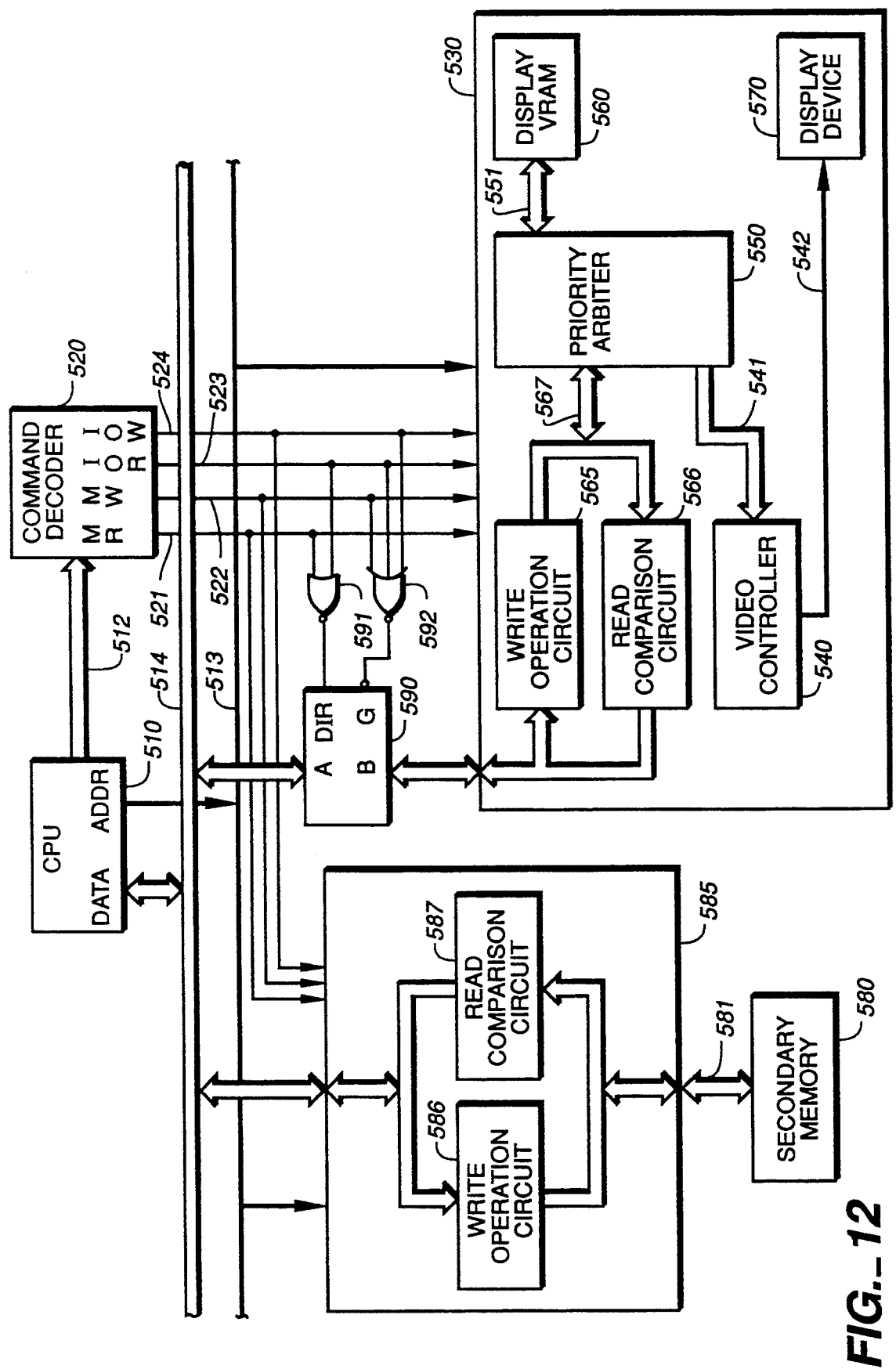
FIG._12

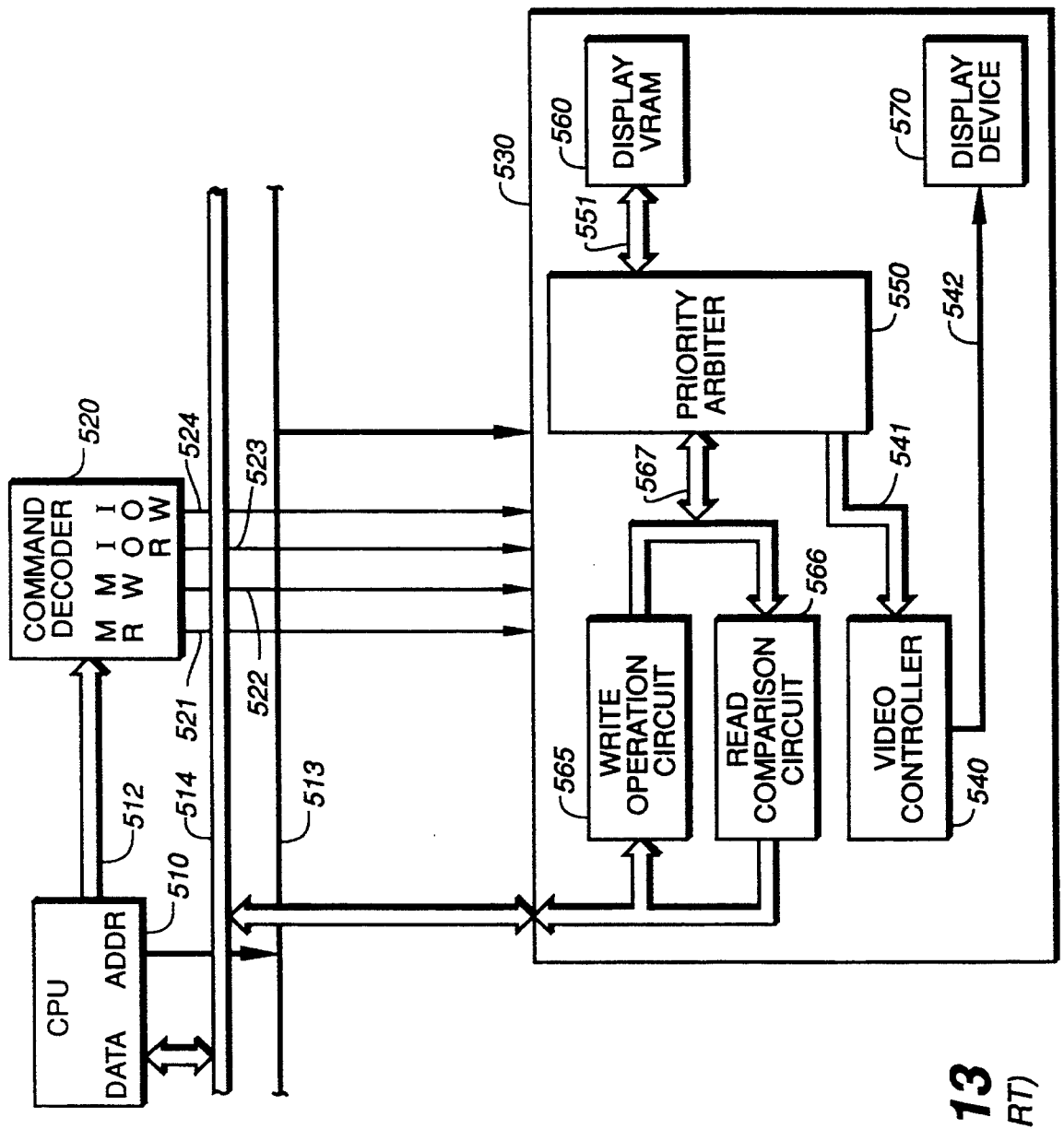
FIG._13 (PRIOR ART)

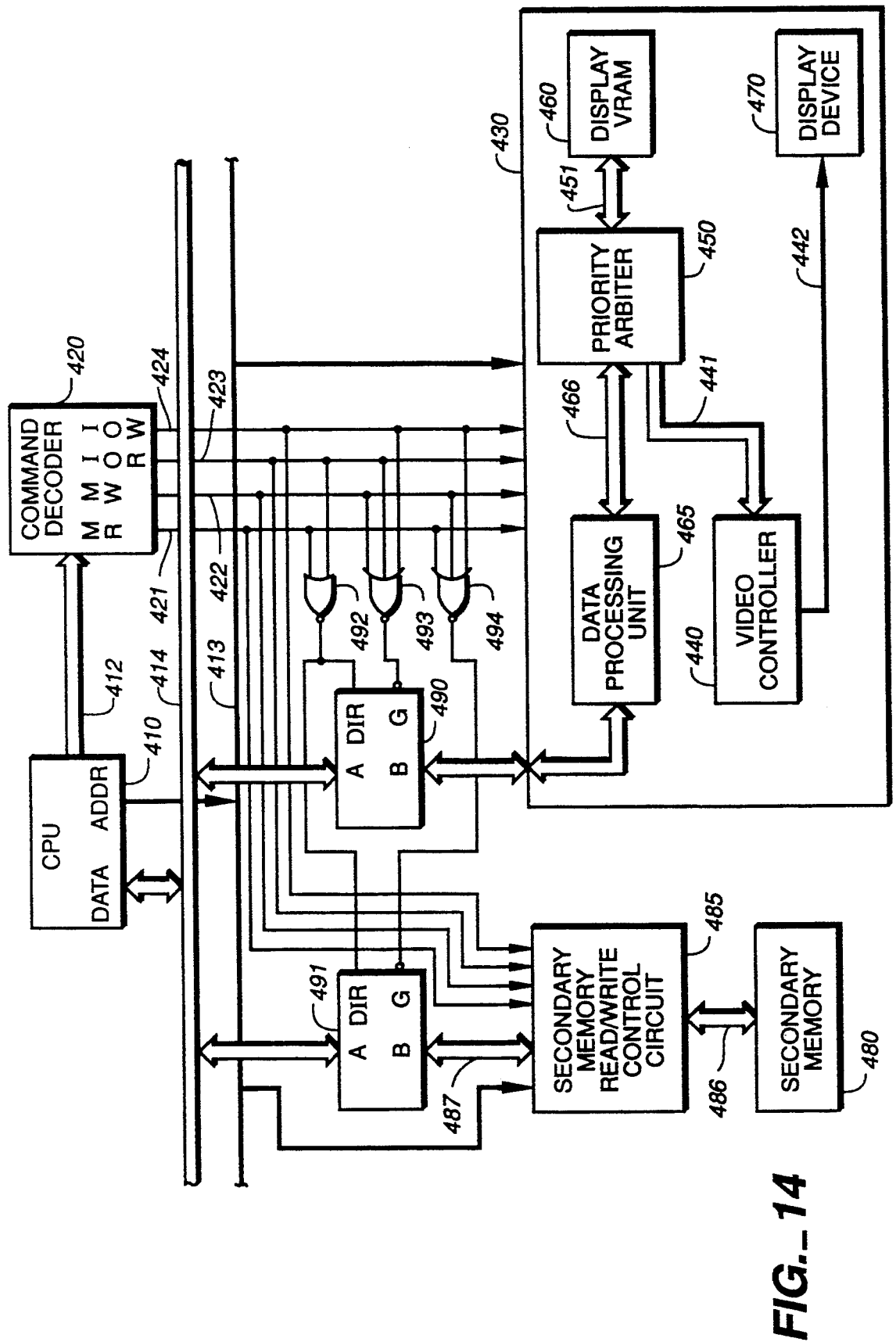
FIG._14

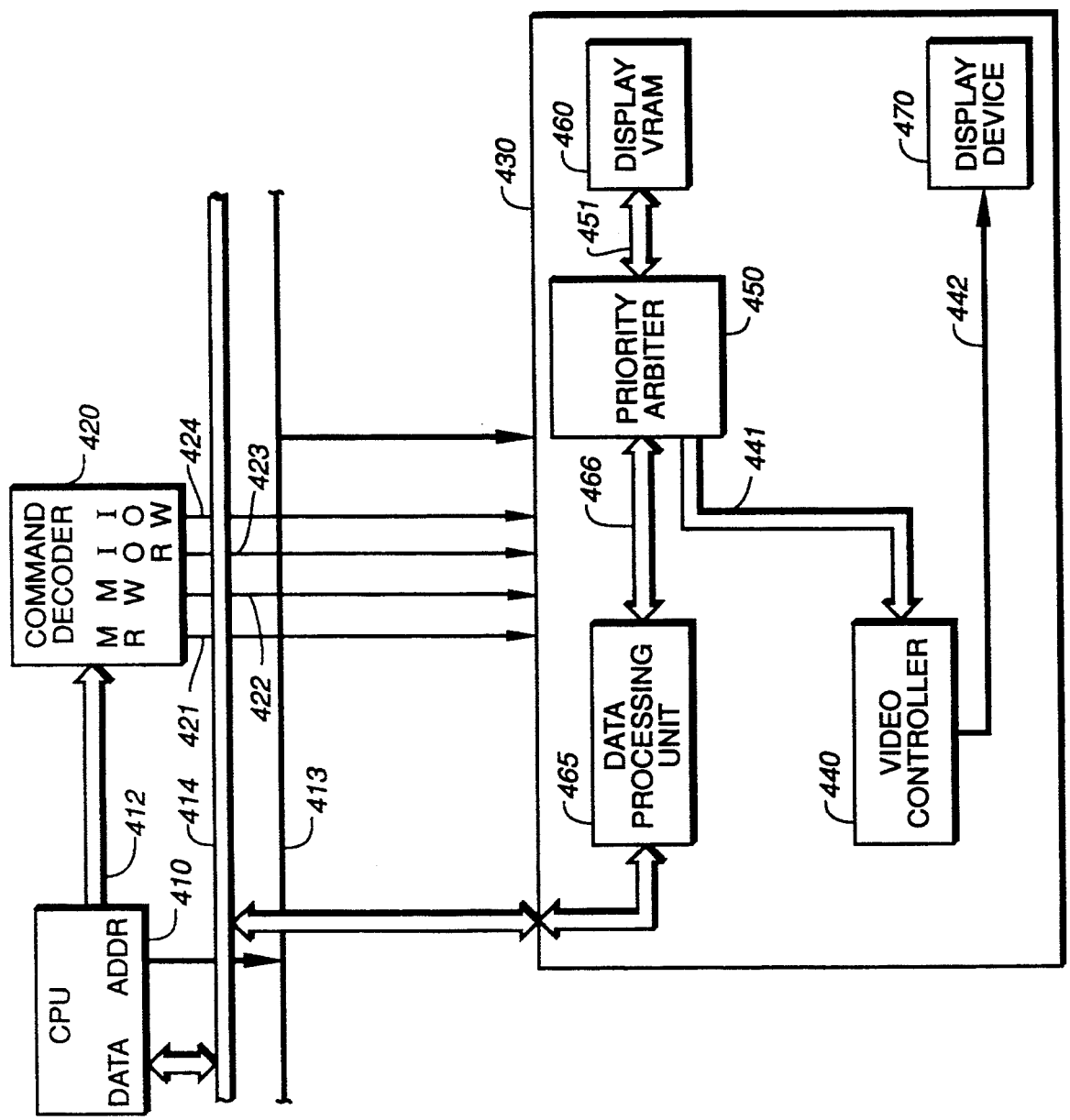
FIG._15
(PRIOR ART)

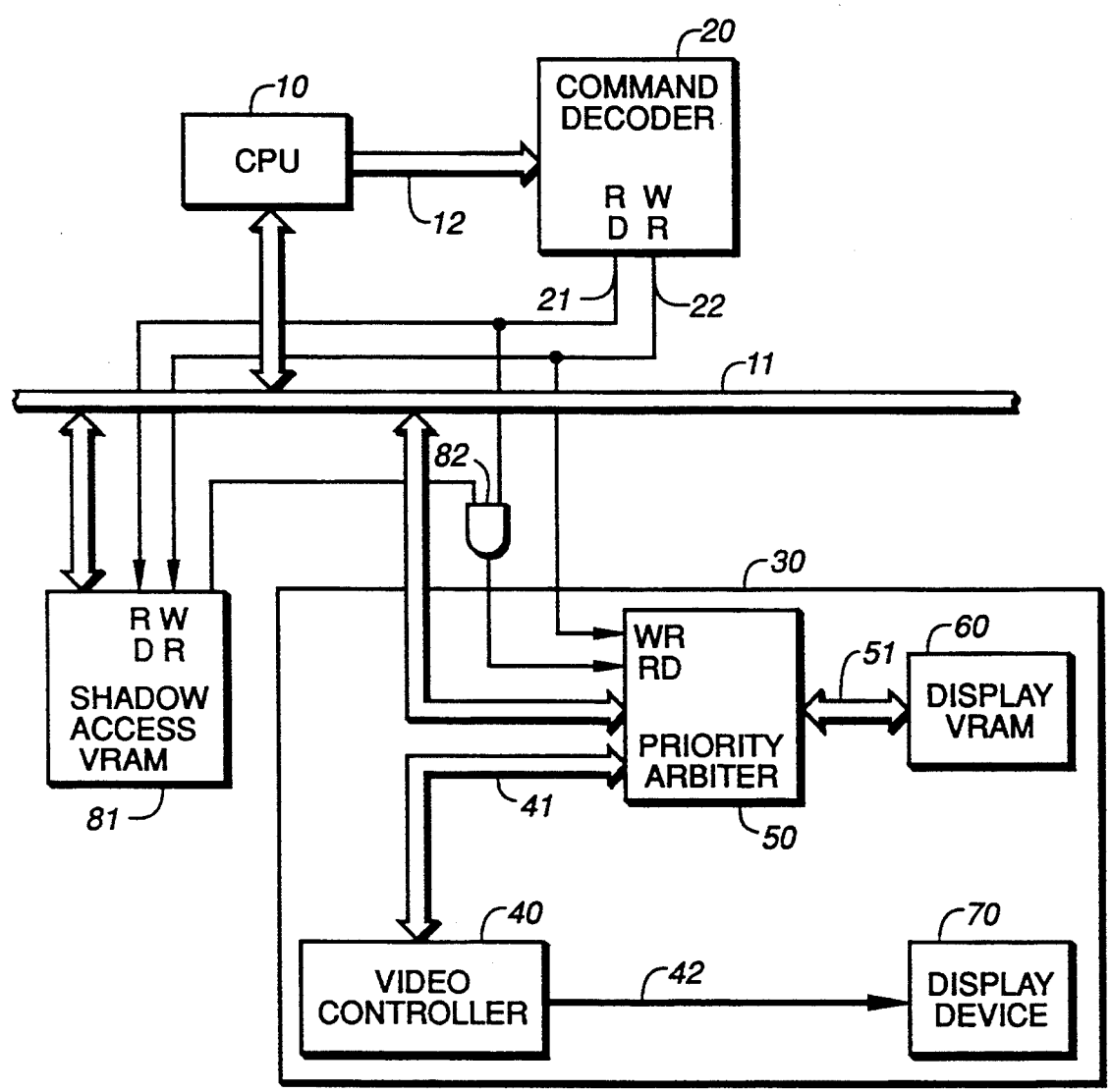
*FIG._16*

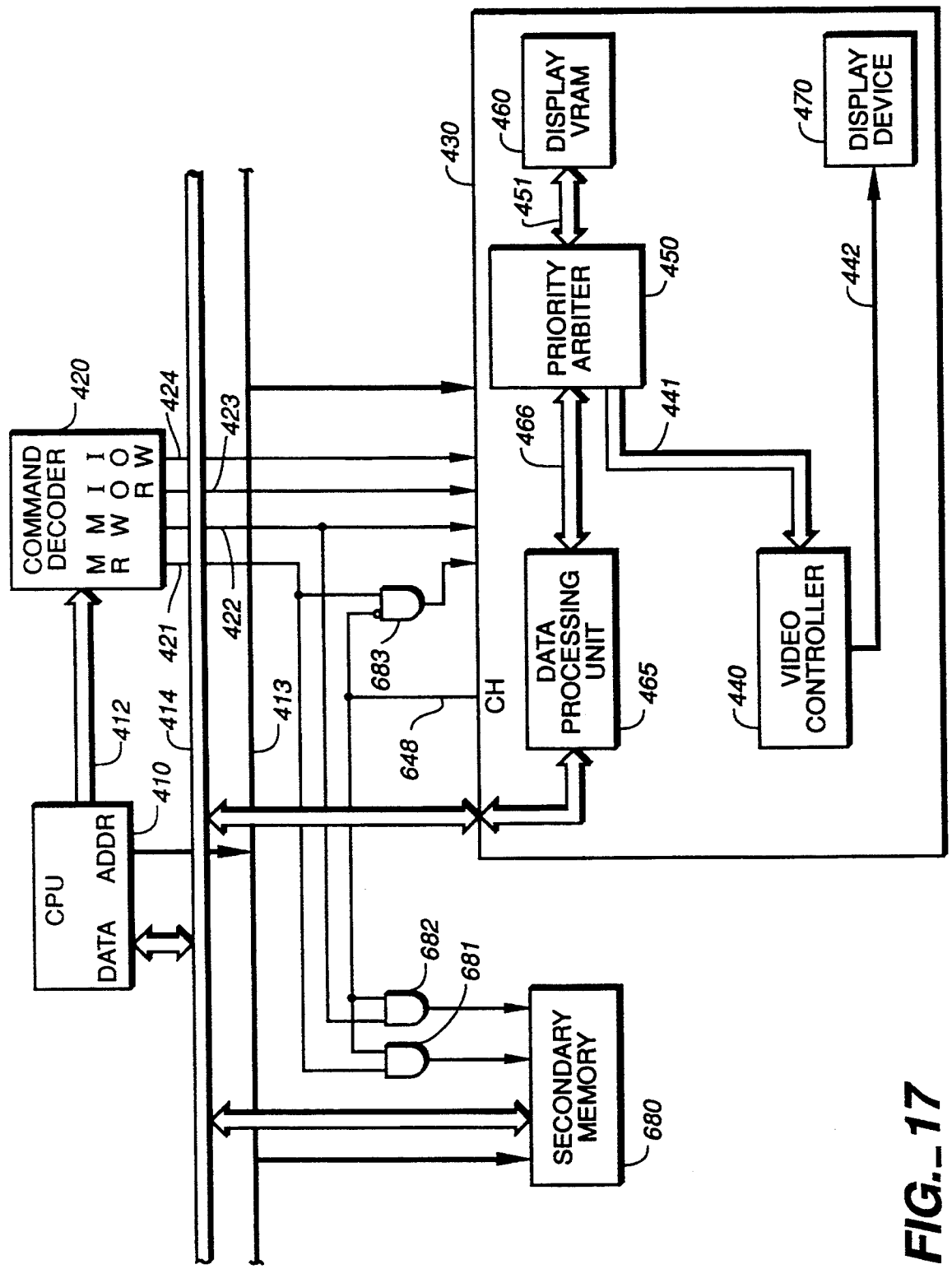
FIG._17

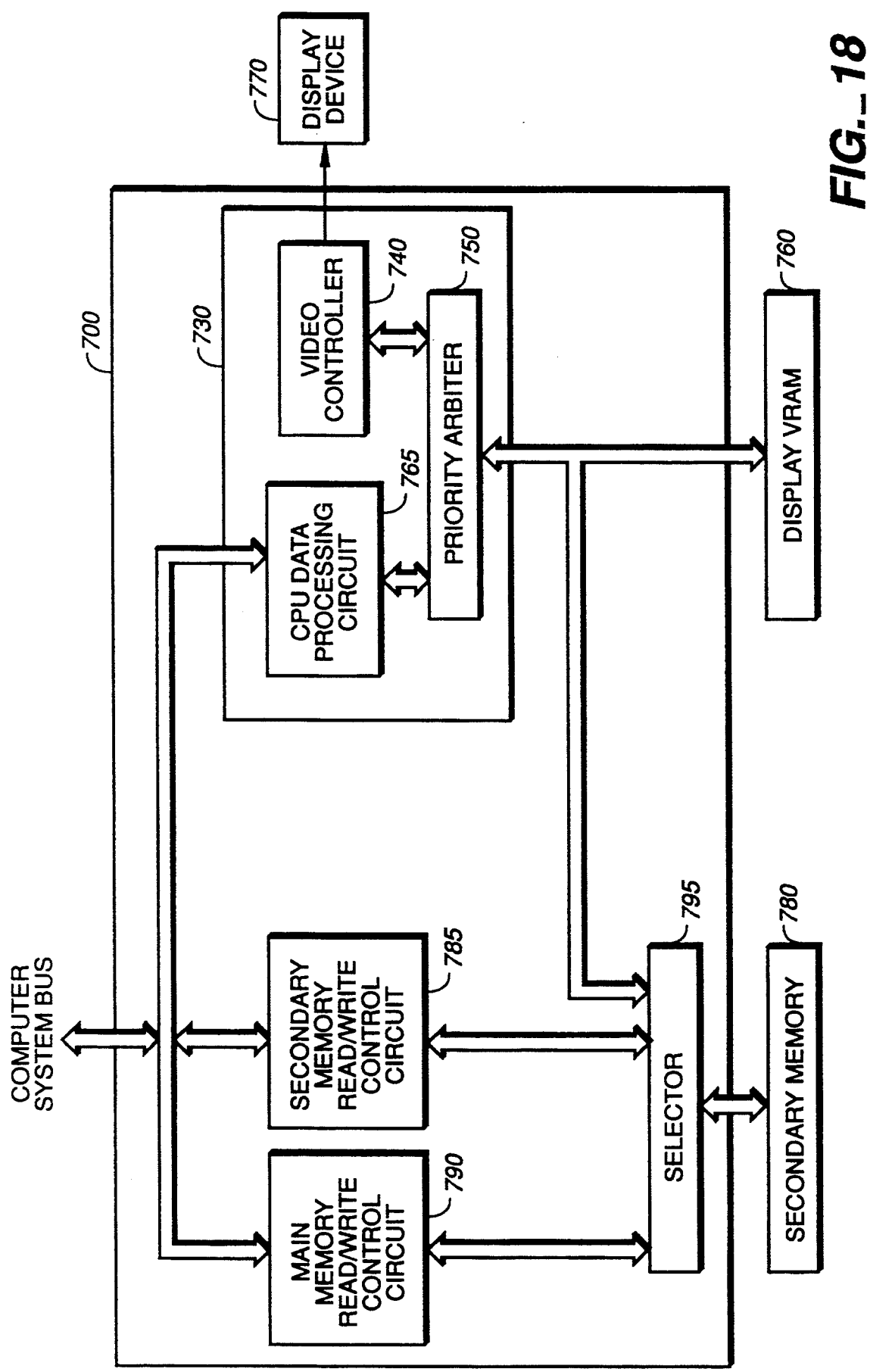
FIG._18

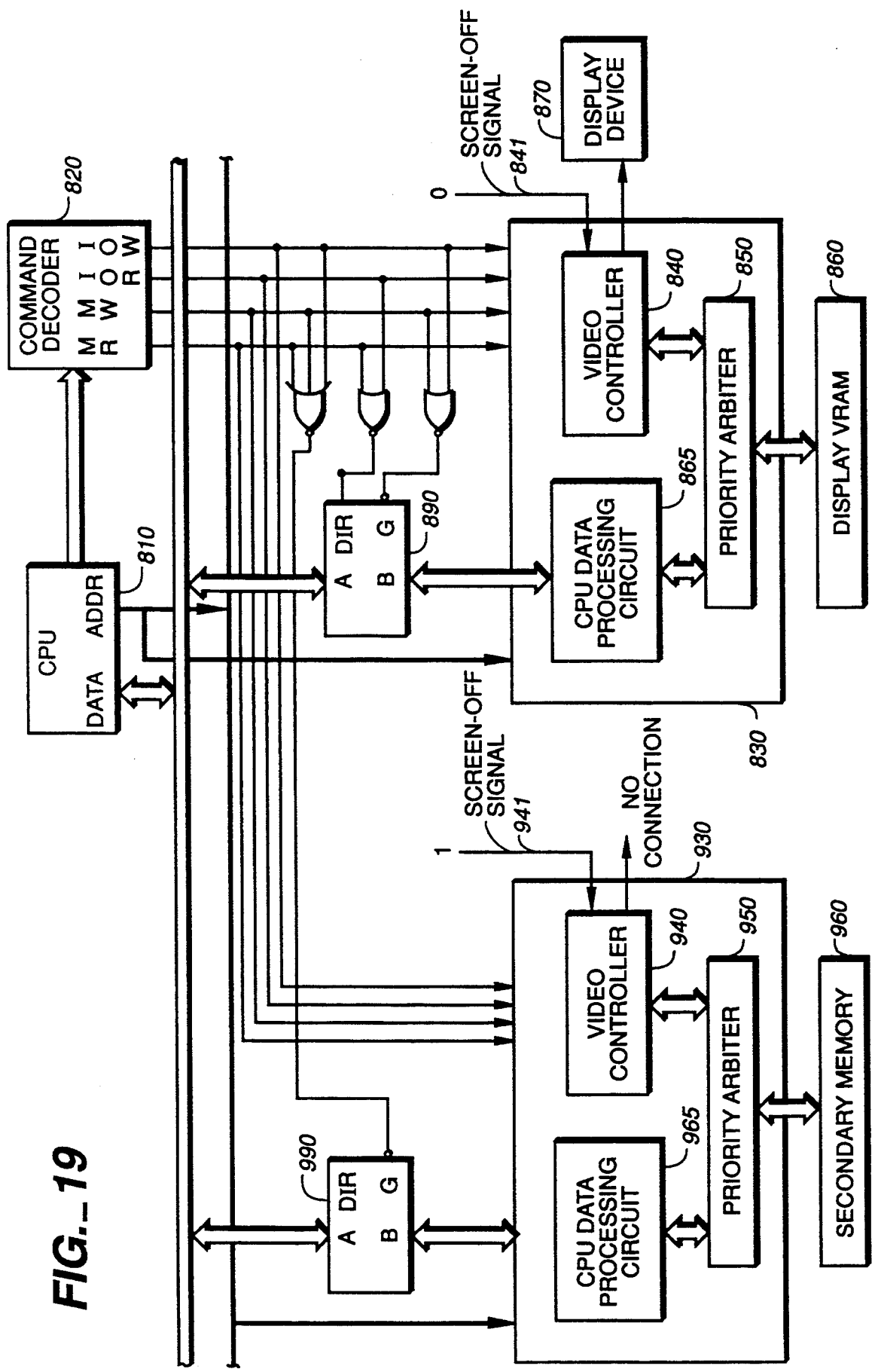
FIG._19

SYSTEM FOR IMPROVING ACCESS TIME TO VIDEO DISPLAY DATA USING SHADOW MEMORY SIZED DIFFERENTLY FROM A DISPLAY MEMORY

BACKGROUND OF THE INVENTION

The present invention relates generally to computers and specifically to video random access memories (RAMs) that are competitively addressed both by CPUs and video controllers.

Description of Related Art

FIG. 1 illustrates a prior art computer system comprised of a central processing unit (CPU) 10 that is connected to a system bus 11 and outputs a CPU cycle code to a signal line 12. A command decoder 20 uses an input from signal line 12 and address information from bus 11 (not shown connected for simplicity) to generate a VRAM read signal 21 and write signal 22. A display unit 30 associated with the computer system is coupled to bus 11 and will respond to read and write signals 21 and 22. Display unit 30 is a plug-in board and has a video controller 40 that is coupled to a display bus 41 and a video channel 42. A priority arbiter 50 chooses whether to connect bus 11 or bus 41 to a VRAM bus 51. A display VRAM 60 stores information to be interpreted by video controller 40 for output on a display device 70. The system of FIG. 1 suffers from a conflict between access requests from video controller 40 and CPU 10 to VRAM 60. If priority arbiter 50 gives preference to access requests from CPU 10 then glitches will appear on the screen of display device 70 when video controller 40 starves for data. If priority is given to video controller 40, then CPU 10 will be forced to execute wait states (which can slow the whole system down).

FIG. 2 is a system which is similar to that of FIG. 1, but has included a first-in-first out (FIFO) write buffer 155 that solves, in part, delays caused to a CPU 110 when a video controller 140 has priority and CPU 110 is attempting a write. Write buffer 155 will buffer write requests to a VRAM 160 and will give CPU 110 an early acknowledgment. However, if write buffer 155 fills up, CPU 110 will again have to wait.

FIG. 3 is a typical system and is similar to those of FIGS. 1 and 2, but a random access memory (RAM) 290 and a read only memory (ROM) 291 are coupled to a bus 211, and a priority arbiter 250 is set up to give access priority to a video controller 240. The current design practice in the industry is to give the video controller priority over the CPU so as to avoid glitches on the screen of the display, but that has the effect of making the CPU wait for sometimes excessively long periods during some video controller accesses. RAM 290 is 640K bytes and is mapped into addresses 00000H to 09FFFFH (H=hexadecimal). Command decoder 220 outputs a signal 292 for RAM reads and a signal 293 for RAM writes. VRAM 260 is 128K bytes and is mapped into addresses 0A0000H to 0BFFFFH, which is just above the space for RAM 290. ROM 291 is 128K bytes and comprises a basic input/output system (BIOS) program. A signal 294 from decoder 220 is asserted for CPU read commands to ROM 291 that are within the address range of 0E0000H to 0FFFFFH. Command decoder 220 outputs a signal 221 for reads of VRAM 260 and a signal 222 for writes to VRAM 260.

It is therefore an object of the present invention to provide a technique for speeding up the reading of VRAM by a CPU through the reduction and/or elimination of wait states.

SUMMARY OF THE INVENTION

According to a preferred embodiment of the present invention, a system comprises a CPU, a video controller, a video display memory, a shadow memory that has an automatically updated duplicate of the image that is stored in the video display memory, and means to direct reads of the video display memory by the CPU to come solely from the shadow memory.

A method according to a preferred embodiment comprises writing display data from a CPU to two places at once, a first place being a display memory and a second place being a shadow memory, and reading back display data to the CPU from the shadow memory only, such that the CPU will avoid the execution of wait states that would otherwise be imposed on the CPU during access of a video controller to the display memory.

Alternatively, a device for and a method of improving the performance of a CPU within a system having a display unit with a video controller and a first memory mapped into a first portion of the address space of the CPU, and a second memory mapped into a second portion of the address space of the CPU and not accessible to the video controller, the first and second portions of the address space of the CPU having at least one address in common, the method comprising the steps of, simultaneously writing display data from the CPU to those addresses in common with the first and second portions of the address space of the CPU, and reading display data to the central processing unit from those addresses which are common to the first and second portions of the address space of the CPU such that only the second memory is accessed by the CPU.

A one-chip integrated circuit (IC) embodiment of the present invention comprises a controller able to coordinate two memories, consisting of a display memory and a secondary memory, in three modes of operation. In the first mode, the display memory is used in a standard display access and the secondary memory is used to supplement the main memory of a CPU. In the second mode, the display and secondary memories are mapped into the same address space of the CPU and function as video memory in a standard video mode. In the third mode, the display and secondary memories are combined to function in an extended video mode.

An advantage of the present invention is that system performance losses caused by delays in the CPU getting access to display RAM are reduced or eliminated.

A further advantage of the present invention is that standard, unmodified display controller plug-in boards may be used and still gain full advantage of the invention.

A further advantage of the present invention is that certain embodiments are compatible with video graphics array (VGA) based systems.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is a block diagram of a first prior art computer system that includes a display memory;

FIG. 2 is a block diagram of a second prior art computer system that comprises a display memory;

FIG. 3 is a block diagram of a third prior art computer system that includes a display memory;

FIG. 4 is a block diagram of a first embodiment of the present invention which comprises a computer system that has a display memory;

FIG. 5 is a block diagram of a second embodiment of the present invention which comprises a computer system that has a display memory;

FIG. 6 is a block diagram of a third embodiment of the present invention which comprises a computer system that has a display memory;

FIG. 7 is the equivalent circuit of the system of FIG. 6 during the time signal 300 is high. Circuit 310 is shown replaced by the direct connection of signals 221-224;

FIG. 8 is the equivalent circuit of the system of FIG. 6 during the time signal 300 is low. Circuit 310 is shown replaced by the direct connection of signals 221-224;

FIG. 9 is a tabular map of the memory address space of the system of FIG. 6;

FIG. 10 is a summary of the roles of RAM, ROM, and VRAM memories for the two operational modes for the system of FIG. 6 as shown schematically in FIGS. 7 and 8;

FIGS. 11A and 11B together represent a comparative diagram of the memory maps and roles of RAM, ROM, and VRAM memories for the two operational modes for the system of FIG. 6 as shown schematically in FIGS. 7 and 8;

FIG. 12 is a block diagram of a fourth embodiment of the present invention which comprises a computer system that has a display memory;

FIG. 13 is a block diagram of a prior art device similar to that of FIG. 12;

FIG. 14 is a block diagram of a fifth embodiment of the present invention which comprises a computer system that has a display memory;

FIG. 15 is a block diagram of a prior art device similar to that of FIG. 14;

FIG. 16 is a block diagram of a sixth embodiment of the present invention which comprises a computer system that has a display memory;

FIG. 17 is a block diagram of a seventh embodiment of the present invention which comprises a computer system that has a display memory;

FIG. 18 is a block diagram of a eighth embodiment of the present invention which comprises a computer system that has a display memory; and FIG. 19 is a block diagram of a ninth embodiment of the present invention which comprises a computer system that has a display memory.

DESCRIPTION OF THE PREFERRED EMBODIMENTS

FIG. 4 illustrates how the system of FIG. 1 can be modified to conform to the present invention. Note that no differences need exist in the display unit 30. A shadow access VRAM memory 80 is added and it is the only recipient of read control signal 21; however, it does share write control signal 22 with priority arbiter 50. Read cycles from CPU 10 will therefore not involve VRAM 60 nor will they cause arbiter 50 to have to decide on read access priorities. The connection of memory 80 causes a duplicate of anything CPU 10 writes to VRAM 60 to be written in to memory 80. If memory 80 is initialized by writing every address of display VRAM 60, then memory 80 will thereafter have an exact and complete copy of the contents of VRAM 60. (Video controller 40 does not write data to VRAM 60.) CPU 10 read accesses can proceed unimpeded by display unit 30. It could happen that CPU 10 would have to wait during a write cycle if video controller 40 is presently accessing VRAM 60 through arbiter 50. It is not enough for CPU 10 to write to only memory 80, which is in parallel, more or less, with VRAM 60. The data set up and hold times for VRAM 60 must be satisfied for every relevant write cycle of CPU 10, and that will require CPU 10 to dwell for some minimal time after priority access is acquired via arbiter 50. Preferably, memory 80 is the same size as VRAM 60 and both occupy the same memory space in the address space of CPU 10. Alternatively, memory 80 could be larger or smaller than VRAM 60, but if smaller, some addresses within VRAM 60 could not be accessed by CPU 10. Furthermore, memory 80 need not necessarily be VRAM as indicated in FIG. 4, it could comprise the main RAM memory storage for CPU 10 and extend, e.g., from 000000H to 0FFFFFH with reads between 0A0000H and 0BFFFFH coming only from main RAM and reads between 0E0000H and 0FFFFFH coming only from ROM. The advantage of such an arrangement is that main RAM can then be partitioned on logical lines instead of borders dictated by the physical capacity of a particular device. Zero wait state operation has been observed when CPU 10 is an Intel Corp. (Santa Clara, Calif.) 80286 microprocessor which is clocked at 10 MHz and memory 80 comprises 100 nanosecond (ns) DRAM.

FIG. 5 illustrates the use of a write buffer 155 that alleviates the delays that would otherwise be caused when CPU 110 tried to access VRAM 160 while video controller 140 has the priority. FIG. 5 is, conceptually, a modification of the system of FIG. 2 to conform to the second embodiment of the present invention. A write buffer 155 is inserted between priority arbiter 150 and CPU 110. Buffer 155 gives CPU 110 a quick acknowledgment on a write cycle and stores the data that CPU 110 wanted to write to VRAM 160. Buffer 155 then requests priority with arbiter 150 and handshakes with it to transfer the data. This arrangement works fine most of the time and will free CPU 110 from incurring wait states in every write cycle, but buffer 155 has a limited storage depth and can fill up if it cannot get access to VRAM 160 faster than CPU 110 passes data.

FIGS. 6 to 8 show a third embodiment of the present invention that is similar to the first embodiment of FIG. 4, except that a data selector 310 has been inserted after command decoder 220A. The data selector 310 allows a single signal 300 to control the mapping of VRAM 260 and shadow VRAM 280. Both VRAMs 260 and 280 are the same size at 128K bytes. In one mode, depicted in FIG. 7, the system of FIG. 6 becomes the equivalent of the system of FIG. 4. That is, writes to display memory are directed simultaneously to VRAMs 260 and 280. Only video read and write control signals 221 and 222 are used to control VRAMs 260 (via arbiter 250) and 280. When CPU 210 requests read access to the display memory, data is actually returned from VRAM 280. After power-on, the contents of VRAMs 260 and 280 will probably be different, so in order to rely on a read of VRAM 280 to represent what is in VRAM 260, both VRAMs will have to be initialized. This is done by writing all the available data addresses with some regular pattern. FIG. 8 shows the second mode in which VRAM 280 is separately addressable from VRAM 260.

In this mode, VRAM 280 will extend the total RAM capacity beyond that afforded by RAM 290. However, the advantage of being able to operate with no wait states during reads of display VRAM 260 will be suspended, because VRAM 280 will no longer respond in place of VRAM 260 and will no longer carry a duplicate memory image of the one in VRAM 260. It will, nevertheless, extend memory storage and that may well more than make up for an occasional slow down of the CPU. Such an extended memory can, for example, be mapped into 100000H to 11FFFFH of the CPU address space. Ordinary RAM 290 and ROM 291 memory control signals 292-294 are unaffected by the mode changes.

The table of FIG. 9 summarizes and relates the various control signals, devices, and address spaces discussed above. Signals 21-24 and 92-94 correspond to 121-124 and 192-194, as well as to 221-224 and 292-294, respectively. All such signals are issued from command decoders 20, 120, and 220, respectively.

The table of FIG. 10 spells out the effects on the mapping of various devices in the address space for the two modes of operation shown in FIGS. 6-8. Shifting from mode one to mode two affects only the mapping of access VRAM 280.

The shift can be seen more visually in FIGS. 11A and 11B. FIG. 11A relates to mode one and FIG. 11B to mode two. In mode two, VRAM 280 appears as extended memory. And in mode one, VRAM 280 disappears behind the shadow of VRAM 260 with the net effect of speeding up, or so it seems, the read access to VRAM 260.

The above first through third embodiments depend on a one-to-one correspondence between the data written by the CPU and the data returned later by the display unit. But not all systems have such a correspondence. VGA (video graphics array) is an international industry standard display unit that does not have the simple one-to-one relationship described above. In FIG. 12, a display unit 530 represents a VGA or VGA-compatible card. Display unit 530, for purposes of explanation here, is the same as display unit 30 in FIG. 1 with the addition of a write operation circuit 565 and a read comparison circuit 566 both of which are in the data path between CPU 510 and display VRAM 560. Circuit 565 can do bit rotations and logical operations, such as AND, OR, and XOR, on data being written by CPU 510 to VRAM 560. Circuit 565 can pass data from CPU 510 straight through from bus 514 to VRAM 560 and it can repeat back the last data read from VRAM 560. Circuit 566 can compare data from VRAM 560 with a value in a register that could have been written in a previous I/O operations. Data from CPU 510 can be transformed on its way to VRAM 560 by circuit 565 and transformed again in a second way by circuit 566 on a read-back cycle. Nevertheless, the present invention can be applied to speed up the reading of data from VRAM 560 by CPU 510 just as it was in the above cases. A pair of circuits 586 and 587 are needed in front of secondary memory 580 to mimic the effects of circuits 565 and 566, respectively, to the display data. With such a pair of circuits, this fourth embodiment realizes the same benefits of read cycle speed up as are described for the first embodiment. As with previous examples, write buffering would improve on most delays typically experienced by the CPU during write cycles to the display unit. It should be noted that read cycles, even though satisfied by data coming from secondary memory 580, will cause arbiter 550 to request data from VRAM 560 and supply this data to read comparison circuit 566. Data from this operation will, however, be prevented from reaching CPU 510 by disabling transceiver 590. The data read to circuit 566 may, in fact, be necessary for subsequent cycles that work on a prior data fetch. If CPU 510 were to supply a read command signal only to secondary memory read/write control circuit 585, and not to display unit 530, then circuit 566 would have a different data item than would circuit 587. Improper future writes from circuit 565 would occur to display device 570.

It is not necessary, but it is preferables that VRAM 560 and secondary memory 580 be the same size. If VRAM 560 is, for example, 256K bytes and secondary memory 580 is 32K bytes, then only CPU accesses to the 32K byte memory area will realize a speed improvement by the reduction of wait states. The other areas of VRAM 560 when accessed will be just as slow as ever.

An input/output (I/O) write signal 524 is also connected to and used by secondary memory read/write control circuit 585. The reason is similar to the purpose in making VRAM 560 deliver data to circuit 566 even though CPU 510 will read the duplicate data only from circuit 587. Data written into the I/O register of display unit 530 on a previous cycle will affect the data that is later written into display memory VRAM 560. Therefore, to duplicate this action, circuit 585 needs to receive the same I/O register write data so that secondary memory 580 and the data it returns will be similarly modified. The net result is the images maintained in both memories, the VRAM 560 and secondary memory 580, will stay in step with one another.

FIG. 13 shows a prior art system with a VGA display unit 530 similar to that shown in FIG. 1. The addition, in FIG. 12, of unit 585 and of secondary memory 580 constitutes the major components necessary to implement the fourth embodiment of the present invention. Read cycles in this prior art system will be considerably slower than those for the system of FIG. 12 due to the wait states inserted by priority arbiter 550, as above.

FIG. 14 shows a fifth embodiment that improves over the prior art of the system in FIG. 15. Two bi-directional buffers 490 and 491, a secondary memory read/write control circuit 485, and a secondary memory 480 are added to implement the present invention. Secondary memory 480 is the same size as display VRAM 460 and is mapped into the same address space. Circuit 485 duplicates the function of data processing unit 465 so that the contents of secondary memory 480 stay in step with that in VRAM 460. One difference between FIG. 14 and FIG. 12 is the I/O read signal 423 is connected to control circuit 485 in FIG. 14 so that control circuit 485 will respond to I/O reads. But the data from an I/O read is not supplied to CPU 410 through buffer 491 due to the absence of a gating signal from NOR gate 494. Instead, I/O read data comes only to CPU 410 from display unit 430 via buffer 490. So display data comes from secondary memory 480 and I/O data from display unit 430 and the contents of memories 480 and 460 track one another.

A sixth embodiment of the present invention is illustrated in FIG. 16 and differs from the first embodiment shown in FIG. 4 in that access VRAM 81 is smaller in size than display VRAM 60. In FIG. 4 access VRAM 80 is the same size, so only a part of display VRAM 60 in FIG. 16 will appear to have improved read access times. An AND gate 82 is needed to disable the read control signal to arbiter 50 when access VRAM will be responding to a particular address read cycle from CPU 10. If access VRAM 81 is mapped into the most frequently accessed areas of display memory, then the cost of a large access VRAM can be saved while still largely benefiting from speed improvement.

FIG. 17 shows an improvement over the device of FIG. 15 and is a seventh embodiment of the present invention. Display unit 430 has both a character mode and graphics mode. In character mode, only a small part (e.g., 32K bytes) of VRAM 460 is used. Characters are simply passed through data processing unit 465 without modification to and from the character mode areas. A small secondary memory 680 is sized and located to correspond to the area in VRAM 460 that is used for character mode. If secondary memory 680 is used only for character mode access, then a data processing unit (in front of secondary memory 680) to mimic the action of data processing unit 465 is not needed. (Compare this with FIG. 14.) Display unit 430 outputs a signal 684 that indicates character mode when high and graphics mode when low. Signal 684 is used to switch memory access between secondary memory 680 and display unit 430 according to the state of signal 684. Accesses that involve secondary memory 680 will respond quicker than those that do not. Character mode access is frequently used in commonplace systems, and the configuration of FIG. 17 has proven to be very effective. And given the relatively small size of secondary memory 680, the cost to implement this is very low.

An eighth embodiment of the present invention is shown in FIG. 18. A single chip IC 700 integrates aspects of the above described embodiments on one IC. Included are a CPU data processing circuit 765, a video controller 740, a priority arbiter 750, a secondary memory read/write control circuit 785, a main memory read/write control circuit 790, and a selector 795. IC 700 can be placed on a plug-in board and will serve to speed up an otherwise standard computer system. At least two modes of operation are possible, and are very much like those described above for FIGS. 6-8. Secondary memory 780 can either be mapped in the address space of a CPU to extend main memory or to speed up display VRAM 760 access. Selector 795 will choose between circuits 785 and 790. In a third mode, called extended video mode, selector 795 selects display unit 730 and secondary memory 780 is used to extend display VRAM 760.

A ninth embodiment of the present invention is shown in FIG. 19. Control circuit 485 of the system in FIG. 14 is replaced by a complete display unit 930 which functions the same way as circuit 485 to speed up access. A first display unit 830 and second display unit 930 are the same. Display VRAM 860 is attached to unit 830 and is structurally identical to secondary memory 960. A display device 870 attaches to display unit 830 while display unit 930 has no connection. A screen-off signal is low at signal line 841 and is high at signal line 941. The screen-off signal informs display units 830 and 930 whether each of them is active or not. When the screen-off signal is high, display unit 930 takes on the role of control circuit 485 in FIG. 14. The operation and benefits follow the model of FIG. 14 and the reader should refer to that discussion above for further details.

The present invention is easy to implement in a number of different systems applications and will therefore find wide acceptance. The combination of a control circuit and VRAM memory has been called a video accelerator and is descriptive of the main benefit of such a combination with a traditional display controller and device.

While the invention has been described in conjunction with several specific embodiments, it will be evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An information processing device (IPD), comprising:
   a) a central processing unit (CPU) coupled to a data bus;
   b) a display memory having a first size corresponding to a first address space;
   c) a video controller;
   d) a shadow memory, coupled to said data bus having a second size corresponding to a second address space, the first size being later than the second size:
   e) arbitration means, coupled to said CPU, said data bus, said display memory and said video controller, for arbitrating between access requests from said CPU and said video controller, such that when said CPU requests write access to said display memory, said CPU is forced to wait until said arbitration means permits said CPU to access said display memory;
   wherein said CPU concurrently writes identical data into said display memory and into said secondary memory when the second address space overlaps with the first address space; and selecting means
   (1) for selecting said shadow memory in response to a reading request by said CPU when second address space overlaps with the first address space, and
   (2) for selecting said display memory when the data is written exclusively in said display memory in response to a read request by said CPU.

* * * * *